(12) United States Patent
Verma

(10) Patent No.: US 6,418,477 B1
(45) Date of Patent: *Jul. 9, 2002

(54) COMMUNICATION NETWORK

(75) Inventor: Dinesh Chandra Verma, Ossining, NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/749,439

(22) Filed: Nov. 15, 1996

(51) Int. Cl.$^7$ .............................................. G06F 13/00

(52) U.S. Cl. ........................ 709/240; 709/245; 709/246

(58) Field of Search ............................... 370/395, 468, 370/449, 451, 462, 469; 709/200.36, 20.46, 245, 246, 236, 240

(56) References Cited

U.S. PATENT DOCUMENTS

| | | | | |
|---|---|---|---|---|
| 4,498,168 A | | 2/1985 | Tseng | 370/85 |
| 5,157,659 A | * | 10/1992 | Schenkel | 370/509 |
| 5,218,676 A | * | 6/1993 | Ben-Ayed et al. | 709/240 |
| 5,638,366 A | * | 6/1997 | Gray | 370/361 |
| 5,694,548 A | * | 12/1997 | Bamgher et al. | 395/200.57 |

FOREIGN PATENT DOCUMENTS

| | | | | |
|---|---|---|---|---|
| EP | 0491202 A2 | | 6/1992 | |
| EP | 4912024 A2 | * | 6/1992 | H04L/12/40 |

* cited by examiner

*Primary Examiner*—Moustafa M. Meky
*Assistant Examiner*—Hien C. Le

(57) ABSTRACT

A communications network for transmitting at least one information packet between a source node and a destination node of the network. The network includes an information cluster transmittable between the source node and the destination node and for having attached thereto an information packet. The information packet is attachable to the information cluster at the source node when the information cluster is at the source node and detachable from said information cluster at the destination node when the information cluster is at the destination node.

24 Claims, 7 Drawing Sheets

COMMUNICATION NETWORK

BACKGROUND OF THE INVENTION

1. Field of the Invention

The present invention is directed generally to computer communication networks, and in particular, to an improved communication network that provides superior quality of service (hereinafter "QOS") guarantees.

2. Description of the Related Art

Quality of Service guarantees are necessary for efficient network communication, and in particular for distributed multimedia applications. The need to provide a high quality of service for continuous-media and real time applications is well recognized in the communication networking community.

Two known modes of communication within a computer communications network are circuit-switching and packet-switching. In a communications network configured for circuit-switching, a dedicated communication path between two (or more) communicating programs is established for use by the communicating programs only. A traditional telephone network is an example of a communication network that utilizes circuit-switching. Although an advantage of a communications network that uses circuit-switched connections is very reliable communication between the communicating programs, a severe drawback is that resources must be reserved for establishing and maintaining the entire link during the communication. Since the computer communication is "bursty" (i.e. communicating programs communicate with each other by exchanging information in bursts in which information is exchanged continuously for a small period of time followed by relatively "long" periods of silence), a communication network based on circuit-switching has a relatively low utilization of network resources.

In a network that employs packet switching, the two (or more) communicating programs do not have any reserved physical network resources. Instead, information originating from a sender program and destined for a receiver program is transmitted in units called "packets". Each packet contains information that identifies the receiver program to which the packet of information is intended. And, based on the address of the receiver program, the packet will be continuously switched throughout the network until the intended receiver program is reached.

In a packet-switched network, packets of information may be forwarded to their destination by intermediate nodes using information in a packet header. The information may be a destination host address (as in IP) or a connection identifier (such as the VPI/VCI field in ATM). Packets can typically be transmitted by a sending host at any time. In some networks, e.g. ATM, packets are constrained to be transmitted using a rate-controlled approach. Each packet is routed independently by the nodes in the network. However, once the packet of information is established by the sender program, the contents of the information packet does not change and remains unchanged as it moves about the nodes of the network until it reaches its destination program.

Packet-switching networks can operate in two modes, as datagrams or as virtual circuits. In a typical datagram mode, packet headers contain (a) information identifying the address of the recipient and (b) any other information that may be needed for processing the packet at any intermediate nodes in the network. The packets of information being transmitted in a network in the datagram mode may be delivered out of order and can take any available path to the receiver in the network. In fact, in a typical situation, the transmitted packets of information are not transmitted together or reach the recipient together since there is no predefined path in which the packets of information travel. Accordingly, there is no guarantee that all the transmitted information will in fact (a) reach the recipient or (b) reach the recipient in the order in which it was transmitted. This latter problem becomes significant in the situation in which information must be received within a specified period or in a particular sequence.

The virtual circuit mode is advantageous over the datagram mode in that the header may be more simply configured since it may merely need contain only the identifier for the path on which it is transmitted in the network.

In a network that operates in a virtual circuit mode, a fixed route is selected at the beginning of the communication for all the packets originating from the receiver.

In general, packet switching better utilizes network resources than networks utilizing only circuit-switching. However, packet-switching networks do not provide the same quality of service (QOS) guarantees provided by a circuit-switching network since, by definition, there are no dedicated physical circuit connections among the communicating programs (computers).

As computer networks further evolve to support audio and video applications together with data applications, a need exists to provide increasing and more reliable quality of service guarantees. Several prior attempts have been made to incorporate networking schemes which provide satisfactory and sufficient quality of service guarantees. Invariably, all of these schemes are based on some form of virtual switching techniques. That is, the known virtual-circuit switching networks utilize resources which are reserved when the virtual circuit is established and released when the virtual circuit is destroyed. When virtual circuits are established, known admission control schemes can be used to attempt to guarantee that a certain quality of service is provided for the establishment of node interconnections before the virtual circuit is established.

However, computer networks that only utilize virtual circuits are deficient in the following respects. For example, establishing a virtual circuit typically takes a relatively long time and does not provide efficient and sufficient quality of service guarantees in communications that last a relatively short amount of time.

Therefore, a network architecture for use in a communication network that provides for greater QOS guarantees than heretofore achieved and which overcomes the aforementioned deficiencies is desired.

SUMMARY OF THE INVENTION

Generally speaking a communications network for transmitting an information packet between nodes of the network is provided. The network preferably comprises at least a source node and a destination node and an information cluster transmittable between the source node and the destination node and for having attached thereto an information packet. The information packet is attachable to the information cluster at the source node when the information cluster is at the source node and detachable from the information cluster at the destination node when the information cluster is at the destination node.

An information cluster will travel about the network along a predetermined path between preselected nodes within the network. Information packets originating at a node among the selected nodes along the predetermined path can be attached to the information cluster when the information cluster arrives at the particular node at which the information packet is waiting. Similarly, the information packet can get off the information cluster at any node of the selected nodes when the information cluster reaches its destination node.

The entire network, in addition to carrying information packets, will preferably carry a plurality of information clusters, although a network with as few as one information cluster is contemplated by the present invention. The information clusters are pre-scheduled and travel between selected nodes at preferably regular intervals. Because of the regularity and predictability of the information clusters, a particular node in the network will know in advance when an information cluster will arrive at that particular node. In this way increased and more reliable QOS guarantees can be provided to the information packets in the network which are attached to the information cluster.

In addition to providing information clusters as disclosed herein, the network may contain additional known networking schemes as described above. In fact, it is contemplated by the present invention that if the information packet cannot be attached to an information cluster because there is no available space thereon or there is no scheduled information cluster scheduled to go to the node to which the information packet must be transmitted within a specified time-period, a different (known) switching scheme such as packet switching would be used for the transmission of the information packet.

Information clusters may be thought of as a combination of the STM (synchronous Transfer Mode) and the ATM (Asynchronous Transfer Mode) approach to handling packets. That is, in STM, packets can only be sent at fixed times, while in ATM packets can be transmitted at any time. In a communication network constructed with the present invention, if an information packet is to be transmitted via an information cluster, the information packet must wait for a prescheduled information cluster to arrive at the node at which the information packet is waiting but may occupy any available space on the information cluster.

When an information packet has to be transmitted between two nodes, the origination node (the node at which the information packet originates) preferably determines on which information cluster the information packet will be carried. The originating node also preferably reserves space for the information packet on the arriving information cluster. Thereafter, the information packet waits for the information cluster to arrive at the node before the information packet can be put on the information cluster.

As the information cluster arrives at each selected node, the node at which the information cluster is located examines if there are any information packets on the information cluster that identifies that particular node as a destination node. If such node has been identified as a destination node for a particular information packet, the information packet destined for that node is removed from the information cluster.

An information packet that needs performance guarantees (QOS requirements) must be able to reserve space on the information cluster in advance so that it is guaranteed transmission by the information cluster. An information packet having a low priority status can also get on an information cluster if there is available space but may get bumped off and placed in a buffer (or the like) if there is an information packet with greater QOS requirements.

Each node within the network knows the arrival and departure times of the information clusters traveling between nodes. Each node also knows the capacity of each arriving information cluster. Therefore, a particular node can easily determine whether it has enough resources to meet the requirements of all the information clusters at any particular node. Any one of several known admission control tests used in conjunction with known schemes can be used for this purpose. In order to provide QOS guarantees in the network, each node has to allocate enough space for the contemplated number of information clusters that may arrive at the node and decide on an upper bound on the delay in processing packets in the cluster. Each information cluster therefore preferably has a designated processing time at each node.

An information packet needing QOS guarantees must be scheduled on an information cluster and therefore must reserve space thereon. Once the information packet has reserved the space, it is guaranteed to have a QOS similar to that of the information cluster on which it will travel. However, if a particular information packet arrives at a particular node or originates at the particular node after the information cluster has passed through that node, the information packet may need to be transmitted by conventional methods such as packet switching.

For example, if the information packet cannot be transmitted between two nodes via a information cluster, a virtual circuit between the two nodes can be established for such transmission.

Lastly, individual or a plurality of information packets can be attached to an information cluster at any point along the network routes and can be detached therefrom at any desired node along the route. In accordance with the invention, information clusters will operate with guaranteed quality of service parameters, and, therefore, information packets requiring a certain quality of service guarantee need to be attached to the appropriate information cluster.

Accordingly, it is an object of the invention to provide an improved communication network architecture that can be utilized on the internet and in corporate intranets, and is particularly useful during browsing thereon, such as the world wide web.

Another object of the present invention is to provide transmission of information in a network that can be more reliably assured that congestion and other problems on the network are not encountered.

Still another object of the present invention is to provide a communications network that increases the reliability that information will be accurately and reliably transmitted between computers or the like.

A further object of the present invention is to provide a communications network that will satisfy quality of service performance requirements.

Still another object of the present invention is to provide a connection-less network which will result in a substantial reduction in network resources.

Still other objects and advantages of the invention will in part be obvious and will in part be apparent from the specification.

The invention accordingly comprises the several steps and the relation of one or more of such steps with respect to each of the others, the apparatus embodying features of construction, combination of elements, and arrangement of parts which are adapted to effect such steps and the article which possesses the characteristics properties and relation of elements, all as exemplified in the detailed disclosure hereinafter set forth, and the scope of the invention will be indicated in the claims.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENTS

Figure 1:
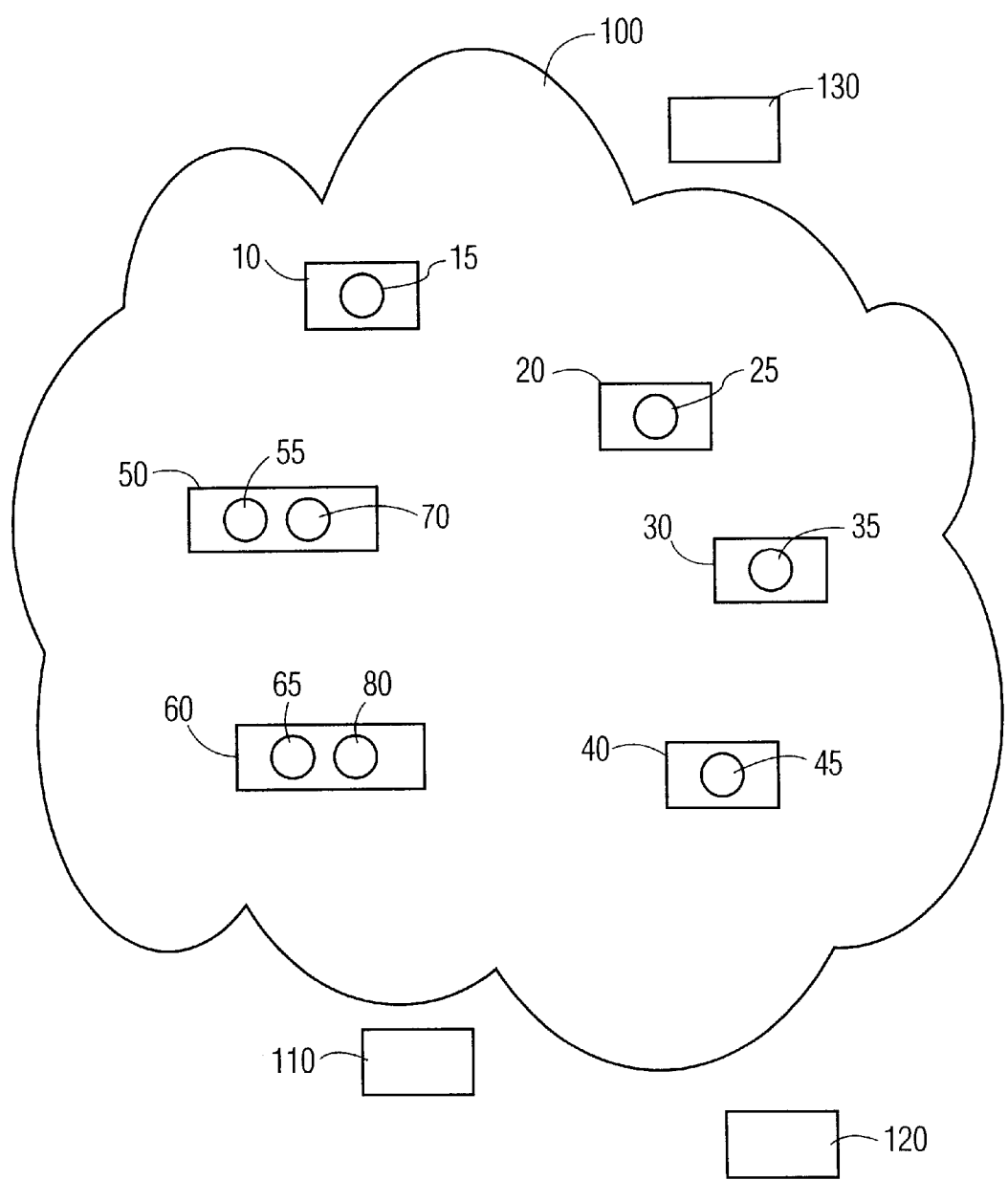
FIG. 1 is a overview of a communications network constructed in accordance with the present invention.

Reference is first made to FIG. 1 which depicts an overview of a communications network, generally indicated at 100, constructed in accordance with the present invention. Communication network 100 (hereinafter "network 100") may include a plurality of hosts 110, 120 and 130 which, for example, may be computers, a plurality of nodes 10, 20, 30, 40, 50 and 60 and a plurality of links. Nodes 10–60 and hosts 110–130 may be interconnectable by known techniques to allow for circuit switching, packet-switching, cluster switching or the like. It is to be understood that network 100 may have more or less nodes and links, and more or less computers than that depicted in FIG. 1.

Within each respective node is a respective controller. Accordingly, in the network depicted in FIG. 1, node 10 includes a controller 15, node 20 includes a controller 25, node 30 includes a controller 35, etc. As discussed in detail below, a function of each controller is to detach information packets from the information cluster when the information cluster (which travels between nodes of the network in accordance with specific link layer protocols, such as HDLC and SDLC) arrives at the respective node. The controller will only detach information packets that are intended to be detached at that particular node. For example, if an information cluster arrives at node 30 carrying information packets intended for node 30, controller 35 will detach the information packets destined for node 30 from the information cluster and place the data on a data bus (not shown).

Each of the respective controllers also determines which information packets can be attached to the information cluster at a particular node, in this example, node 30. That is, in an effort to transmit information in accordance with quality of service requirements, there may be information packets waiting (that is, in a buffer) at node 30 with one particular set of QOS requirements, and there may be an information packet waiting at the same node 30 with a different set of QOS requirements. The controller (i.e. controller 35) monitors the information packets being attached to the information cluster for transportation based on the QOS requirements.

As another example, assume (a) an information cluster arrives at node 40 and is thereafter scheduled to be transmitted to node 50, and that (b) there are two separate information packets waiting at node 40 for transmission to node 50, and (c) that the first information packet has a higher priority than the second information packet, and (d) there is space (i.e. memory) on the information cluster for accommodating only one of the two information packets, the controller at node 40 (i.e. controller 45) will determine that the first information packet should be transmitted because of its higher priority (greater quality of service requirements). However, if there are empty information packet slots (i.e. memory) on the information cluster so as to be able to accommodate both information packets, controller 45 will attach both information packets to the information cluster.

Also depicted in FIG. 1 is a server 70 and a scheduler 80. In the preferred embodiment, server 70 and scheduler 80 are centralized and respectively located in nodes 50 and 60, but the present invention contemplates, and it is within the knowledge of one skilled in the art, that server 70 and/or scheduler 80 may be implemented in a distributed manner, i.e. with components of server 70 and scheduler 80 implemented in a plurality of nodes in the network.

Generally speaking, a function of server 70 is to reserve space (on the travelling information clusters) for information packets that require quality of service guarantees. Server 70 also monitors the quality of service requirements of each information packet and maintains the arrival and departure schedule of the information clusters at each node within network 100. In this way, server 70 determines which information cluster will best meet the QOS requirements of the information packets attached to the information cluster and waiting in the buffers at the respective nodes. In particular, the controllers preferably communicate with server 70 to reserve space on the information cluster. The communication may be initiated either on generation of each new information packet or for a pre-reserved block of slots. The controllers thereafter preferably monitor their requirements and dynamically adjust their reservations.

A function of scheduler 80 is to determine the types of information clusters that will be transmitted throughout network 100 and how frequently the information clusters should be transmitted between the nodes thereof. Scheduler 80 also coordinates the schedules of each information cluster in accordance with predetermined programming constraints/protocols as disclosed below. Scheduler 80 also broadcasts the updated schedule and information clusters throughout the network via routing protocols such as OSPF.

Figure 2:
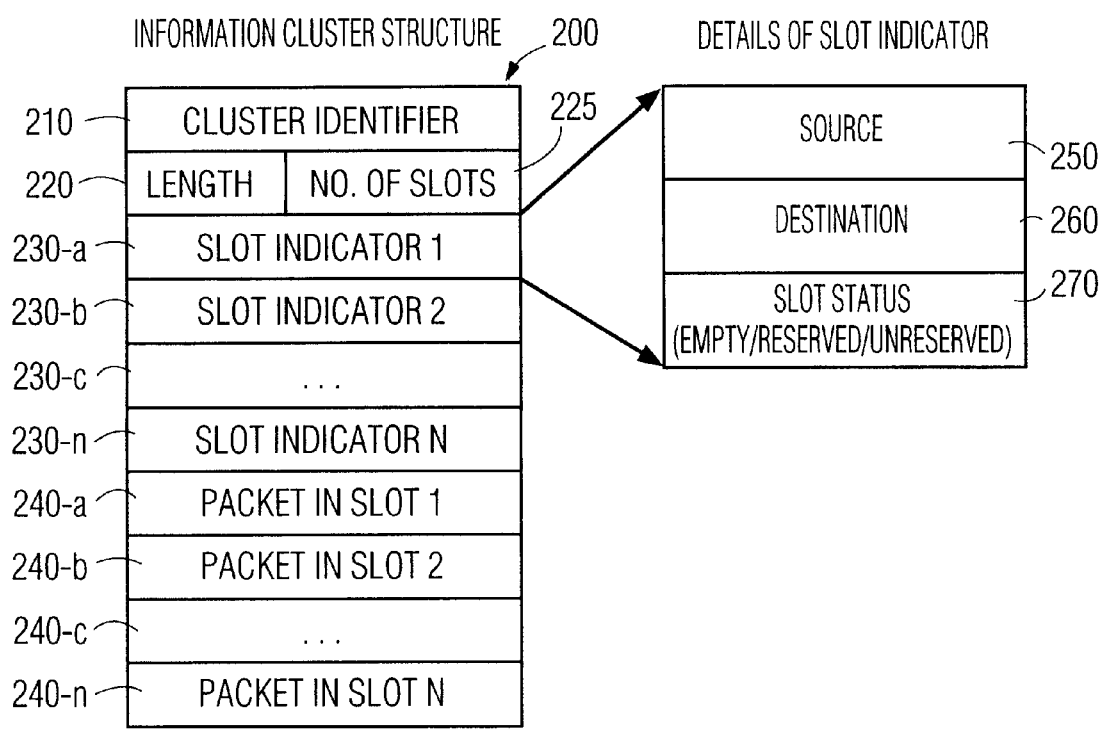
FIG. 2 depicts a preferred structure of an information cluster configured in accordance with the present invention.

Reference is now made to FIG. 2 which depicts an information cluster generally indicated at 200, configured in accordance with the present invention.

Information cluster 200 preferably contains a cluster identifier 210 which contains the identity of the information cluster itself and a capacity indicator 225 which indicates the number of information packets that can be accommodated by information cluster 200 at any one time. A length indicator 220 indicates the current length of the information cluster in bytes, for example, which may be less than the maximum possible length of the information cluster if some of the slots, as disclosed below, are empty.

Information cluster 200 includes a plurality of information packet slots 240a, 240b, 240c, . . . 240n. It is within these information packet slots that the actual information packets are stored as they travel attached to the information cluster 200 among the selected nodes.

Information cluster 200 also includes a plurality of slot indicators 230a, 230b, 230c, . . . 230n. The number of slot indicators correspond to the number of information packet slots 240a–n available on the information cluster. The slot indicators contain control information about the packet in a slot. Each slot indicator identifies the level of priority (i.e. the QOS requirements) of the information packet stored in the corresponding information packet slot. The slot indicator 230a–n also indicate whether its corresponding information packet slot is empty, in which case the slot can accommodate an information packet waiting at a node in a manner discussed below. The slot indicator contents are illustrated in FIG. 2 as consisting of three fields. A field 250 identifies the source of the information packet in the slot, a field 260 identifies the destination of the information packet in the slot and a field 270 identifies the priority of the information packet in the slot (such as whether the information packet is a guaranteed QOS packet, a best efforts packet or if the slot is empty).

Information cluster 200 may also contain a trailer (not shown) which can indicate the end of the information cluster. The trailer may also store the length of the information cluster. In the preferred embodiment, information clusters have a fixed capacity, able to carry a fixed number of information packets. However, empty trailing slots in the information cluster need not be physically transported so information clusters may actually be of a variable length.

Figure 3:
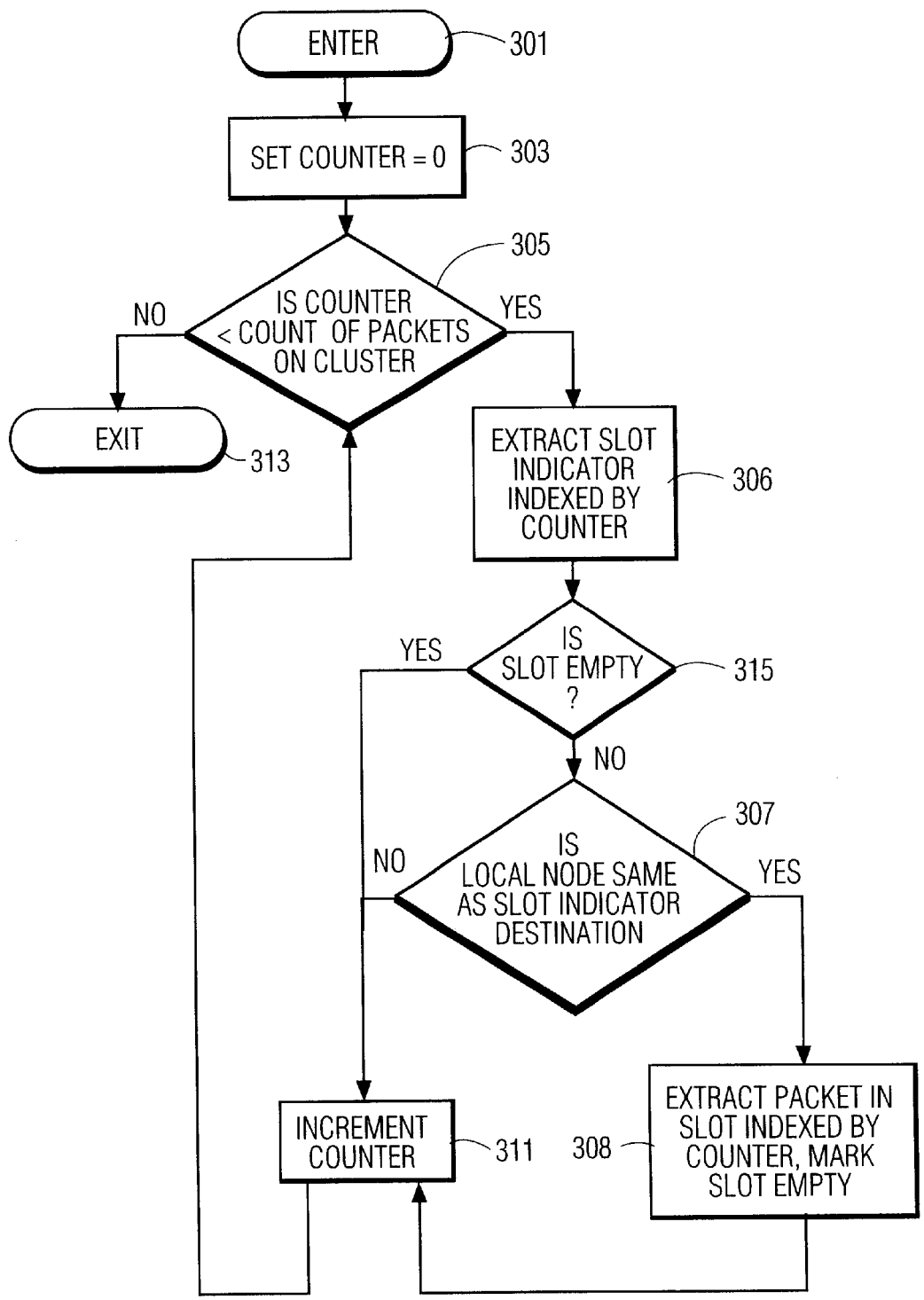
FIG. 3 is a flow chart illustrating a preferred method of extracting information from an information cluster after the information cluster has arrived at a particular node.
Figure 4:
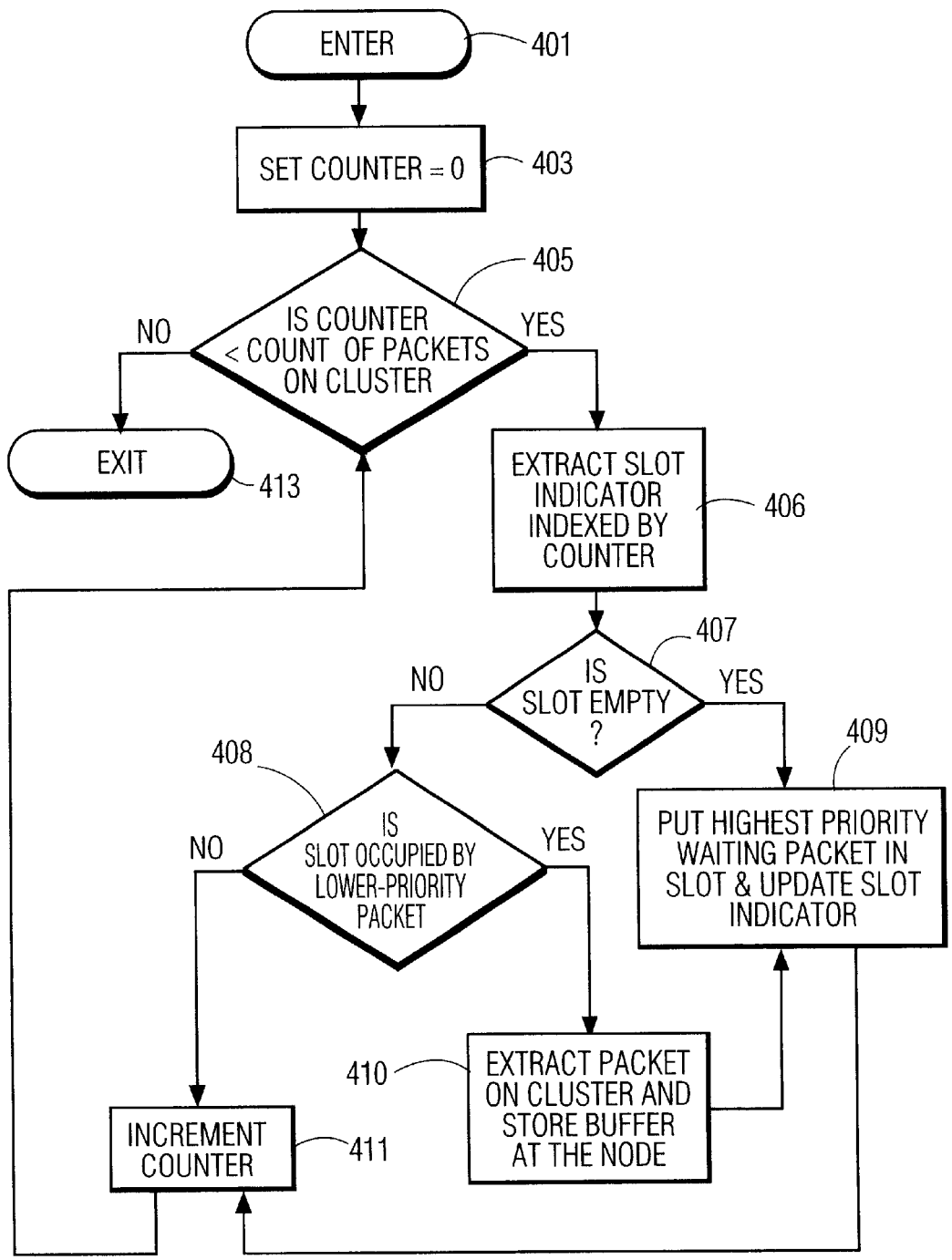
FIG. 4 is a flow chart illustrating a preferred method of placing information packets onto an information cluster when said information cluster is at a particular node.

Reference is now made to FIGS. 3 and 4 which depict in detail the steps for attaching information packets to an information cluster and for detaching information packets from the information cluster when the information cluster is at a node. Specifically, information clusters will preferably arrive at each of the selected nodes at prescheduled times. In accordance with known protocols, information packets arrive at the nodes along data buses within the network. Moreover, information packets that are detached from an information cluster are configured at the node and outputted (if necessary) to the correct output data line. Information packets may be temporarily extracted from the information cluster and placed in a temporary buffer for later placement on another information cluster.

Additionally, reference should be made to the following tables which illustrate an example in accordance with the invention.

| SLOT INDICATOR 230 (a–n) | PACKET SLOT 240a–n | ORIG. NODE | DEST. NODE | PRIORITY or EMPTY |
|---|---|---|---|---|
| 230a | packet1 | 10 | 30 | priority 1 |
| 230b | packet2 | 10 | 20 | priority 2 |
| 230c | packet3 | 10 | 30 | priority 3 |
| 230d | packet4 | 10 | 40 | priority 4 |
| 230e | packet5 | 10 | 40 | priority 4 |
| 230f | — | — | — | empty |

Waiting in the buffer at node 20:

| packet no. | orig node | dest node | PRIORITY |
|---|---|---|---|
| packet 6 | 20 | 30 | priority 1 |
| packet 7 | 20 | 30 | priority 1 |
| packet 8 | 20 | 30 | priority 1 |

In the above example, information cluster 200 is carrying 5 information packets (packets 1–5). The last information packet slot 240f is empty. This is indicated by slot indicator 230f. Each packet has a respective originating and destination node, both of which are preferably stored in the respective slot indicator 230a–f. That is, information is maintained as to where the information packet was first attached to the information cluster and at which node the information packet is to be detached from the information cluster. Each packet also has a respective particular priority ("p") level 1–4 (wherein p1>p2>p3>p4). This priority may be representative, in a quantitative manner, of the QOS requirements.

For purposes of illustration, it will also be assumed that information cluster 200 has just arrived at node 20 after having left node 10 (where packets 1–5 were attached thereto). Moreover, information packets 1, 3, 4, 5 are not destined for node 20, but rather nodes 30, 30, 40, 40 respectively. Packet 2 is scheduled for being detached from information cluster 200 at node 20. Information cluster 200 is scheduled to travel to node 30 after departing node 20.

Reference is now made to FIG. 3 which illustrates the steps of detaching packets from an information cluster. An information cluster 200 enters node 20 (step 301), a counter in node 20 is reset, preferably to zero (step 303). The value of the counter is then compared to the number of information packets stored on information cluster 200 at the time when information cluster 200 enters node 20 (step 305). If there were no information packets stored in any of the information packet slots 240a–n (step 313), controller 25 would determine if there were any information packets in a buffer at node 20 which were awaiting transmission to another node in the network 100 (see FIG. 4). In this example, packets 6 and/or packet 7 (depending on the length of the information cluster) could be attached to the information cluster in accordance with the steps detailed below.

If controller 25 determines that there are information packets on information cluster 200 (step 305), the node at which the information cluster is located (node 20) is compared to the destination node stored in the respective slot indicator (step 307) for the first information packet (packet 1) stored in slot 240a. If the destination node of packet 1 stored in slot indicator 230a indicates that information packet 1 is destined for particular node 20, information packet 1 will be detached from information cluster 200 and outputted on a data line in accordance with known protocols (step 309). In the above example, packet 1 is destined for node 30. Therefore, packet 1 remains on information cluster 200. The counter is then incremented (step 311). If the slot is empty (step 315) the counter is also incremented (step 311).

Once again, it will be determined that there is a second packet (packet 2) attached to information cluster 200 (step 305). The node at which information cluster 200 is located (node 20) is compared to the destination node stored in slot indicator 230b (step 306). The destination node stored in slot indicator 230b indicates that information packet 2 is destined for node 20 (step 307). Therefore, information packet 2 is detached from information cluster 200 and outputted on an data line in accordance with known protocols (step 309). After an information packet is detached from information cluster 200, the information packet slot which previously stored the extracted information packet (in this example 240b) is indicated as being "empty"; that is, information packet slot 240b is available to accept another information packet (such as packet 6) therein.

Again the counter will be incremented (step 311) to point to the next information packet attached to the information cluster 200.

As will be clear to one skilled in the art, this procedure is repeated until each of the slot indicators are indexed to determine if any other packets should be detached from information cluster 200.

Reference is now made to FIG. 4 which illustrates the steps of attaching information packets to information cluster 200. The routine of attaching information packets to the information cluster is preferably performed after all the necessary information packet are detached from the information cluster.

As the routine to place information packets on the information cluster begins (step 401) a counter in the node is reset, again preferably to zero (step 403). The counter is then compared to the first slot indicator 230a (step 405). After the counter, as discussed below, has indexed each of the slot indicators 230a–e, information cluster 200 will exit node 20 and will proceed to the next node on the information cluster's prescheduled route (node 30 in the example).

As will be recalled, packet 2 has been extracted from information cluster 200 thus leaving information packet slot 240b empty. Information slot 240e was empty at the time when information cluster 200 entered node 20.

Therefore, slot indicator 230a is indexed (step 406) to determine if the corresponding information packet slot 240a is empty (step 407). In this example, information packet slot 240a is not empty. If the slot being indexed is occupied by an information packet, the priority level of the indexed information packet is determined (step 408). If there is a higher priority information packet waiting for transmission at the node, the lower priority information packet (already attached to the information cluster) is detached from the information cluster and placed in the node's buffer for subsequent transmission (step 410). The waiting higher priority information packet is then attached to the information cluster (step 409). If the slot is occupied (step 407) and there is no higher priority information packet waiting for transmission at the node at which the information packet is waiting (step 408), the counter will be incremented (step 411) and the routine is again performed until each of the slot indicators are indexed (step 405).

That is, if there is an information packet waiting at node 20 with a greater quality of service requirement (a higher priority) than a packet currently on the information cluster, the packet with the higher priority will be placed on the information cluster and the packet with the lower priority will be placed temporarily in a buffer at the node for later transmission on a subsequent information cluster. In the above example, after packets 6 and 7 are placed on the information cluster 200 (in slots 240b and 240e) as discussed below, packet 8 may be placed on the information cluster in place of an information cluster having a lower priority (such as packet 5).

Therefore, the counter is incremented (step 411) and each successive slot indicator (230b–f) is indexed to determine if its respective information packet slot is empty (steps 406, 407). Since information packet slots 240b and 240e are empty, packets 6 and packet 7 can be placed on information cluster 200 (step 409). Thereafter the data regarding the originating and destination node and its priority are stored in the respective slot indicator (step 409).

The information packet (in this example, packet 5) with the lower quality of service requirement (priority 4) will be detached from information cluster 200 and put into a buffer. The information packet with the greater quality of service requirement (packet 8) will then be placed in the information cluster in the slot previously occupied by packet 5 with the lesser QOS requirement. In other words, an information packet having a lesser QOS requirement will have to forego space on an information cluster if an information packet with a greater QOS requirement is waiting at the node at which the information cluster is located.

It is also within the knowledge of one ordinarily skilled in the art to interleave the process steps of FIGS. 3 and 4 so as to develop one interleaved program for the attachment and detachment of information packets to and from the information cluster. Additionally, the steps can be performed either at the input line or the output line of a node.

After the proper information packets are attached to information cluster 200 and detached therefrom, information cluster 200 leaves node 20 after a predetermined time. The time at which the information cluster leaves a node and the length of time for which the information cluster remains at a node is determined monitored and maintained by the controllers within the respective nodes. The time during which an information cluster remains at a node is preferably greater than the time required for the processing of the information packets at a particular node.

Server 70 also controls the allocation of information packet slots for information packets attached to an information cluster. Server 70 preferably maintains and monitors the current information cluster schedule within network 100 and the requirements (such as delay constraints and loss requirements) of each information cluster in the network. On the basis of the communicated schedules, server 70 or the respective controllers determines which information cluster to select out of the operating information clusters in order to best meet the QOS requirements of the information packets in the network. Server 70 accordingly reserves an information packet slot on the appropriate information cluster for the information packet.

For example, the information cluster selected to carry a particular information packet must be going to the destination node to which the information packet must be transmitted, and must have a schedule that satisfies any delay constraints (or the like) of the information packet. For example, if there are no suitable information clusters available, the information packet will be denied access on all information clusters and will have to either be transmitted via an alternative known transmission scheme or be transmitted as a best-effort packet. A best efforts packet is one that is offered no QOS guarantees by the network. The network attempts to deliver the packet but may discard the packet if its resources are exceeded.

The scheme can be easily extended to the case where multiple information packet slots for a sequence of information packet transmission are required, and several information clusters are used. This scheme assumes fixed length packets but can be extended to variable length packets.

Figure 5:
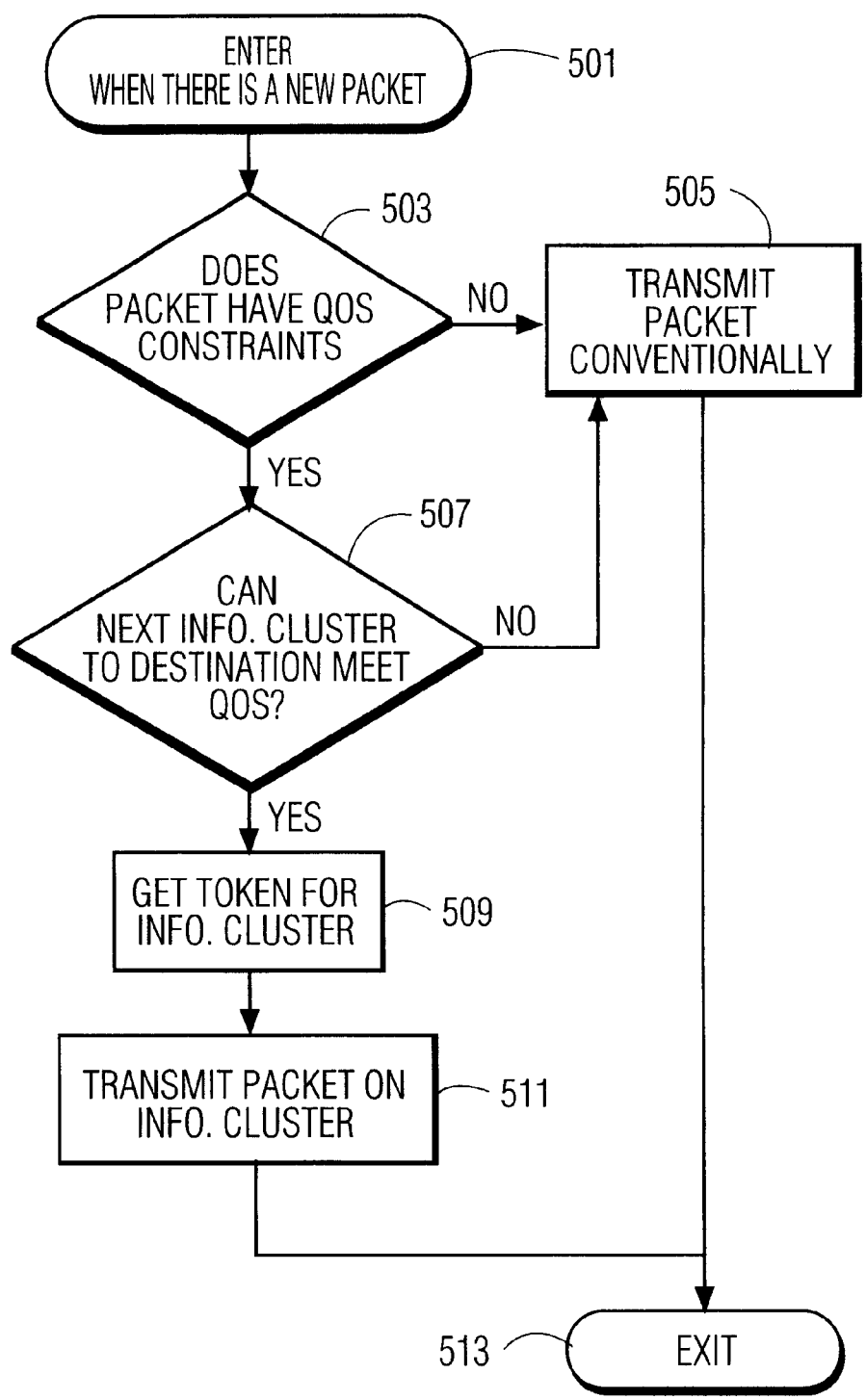
FIG. 5 is a flow chart illustrating a preferred method of transmitting information within a communication network constructed in accordance with the present invention.

Reference is now made to FIG. 5 which depicts the preferred decision processes for efficiently transmitting information clusters in network 100 and among the selected nodes thereof. The following example is illustrated. Waiting in the buffer at node 40 are packets 9–11 with the following status:

| packet no. | orig node | dest node | PRIORITY |
|---|---|---|---|
| packet 9 | 40 | 60 | none |
| packet 10 | 40 | 60 | priority 2 |
| packet 11 | 40 | 60 | priority 8 |

As the foregoing chart illustrates, it is assumed that an information packet 9 enters node 40, via a data bus for example (step 501). The server then determines if packet 9 contains QOS constraints (step 503). If there are no constraints, then packet 9 may be transmitted to destination node 60 via a known scheme, such as cluster switching or circuit-switching, for example (step 505). The subroutine will then be completed (step 513). If a new information packet
enters node 40 (step 501), again server 70 will determine if the information cluster contains QOS constraints (step 503). In the above example, packet 10 has QOS constraints and therefore, server 70 determines if the requirements can be met by the next information cluster scheduled to arrive at node 40 (step 507). If server 70 determines that the next available information cluster arriving at node 40 can accommodate information packet 10, then information packet 10 will have an information packet slot reserved thereon (step 509) and thereafter, the information packet will be transmitted by the identified next information cluster (step 511). If server 70 determines that the next available information cluster arriving at node 40 cannot accommodate information packet 10, then information packet 10 will be transmitted by a known scheme such as packet switching or the like (step 505).

Figure 6:
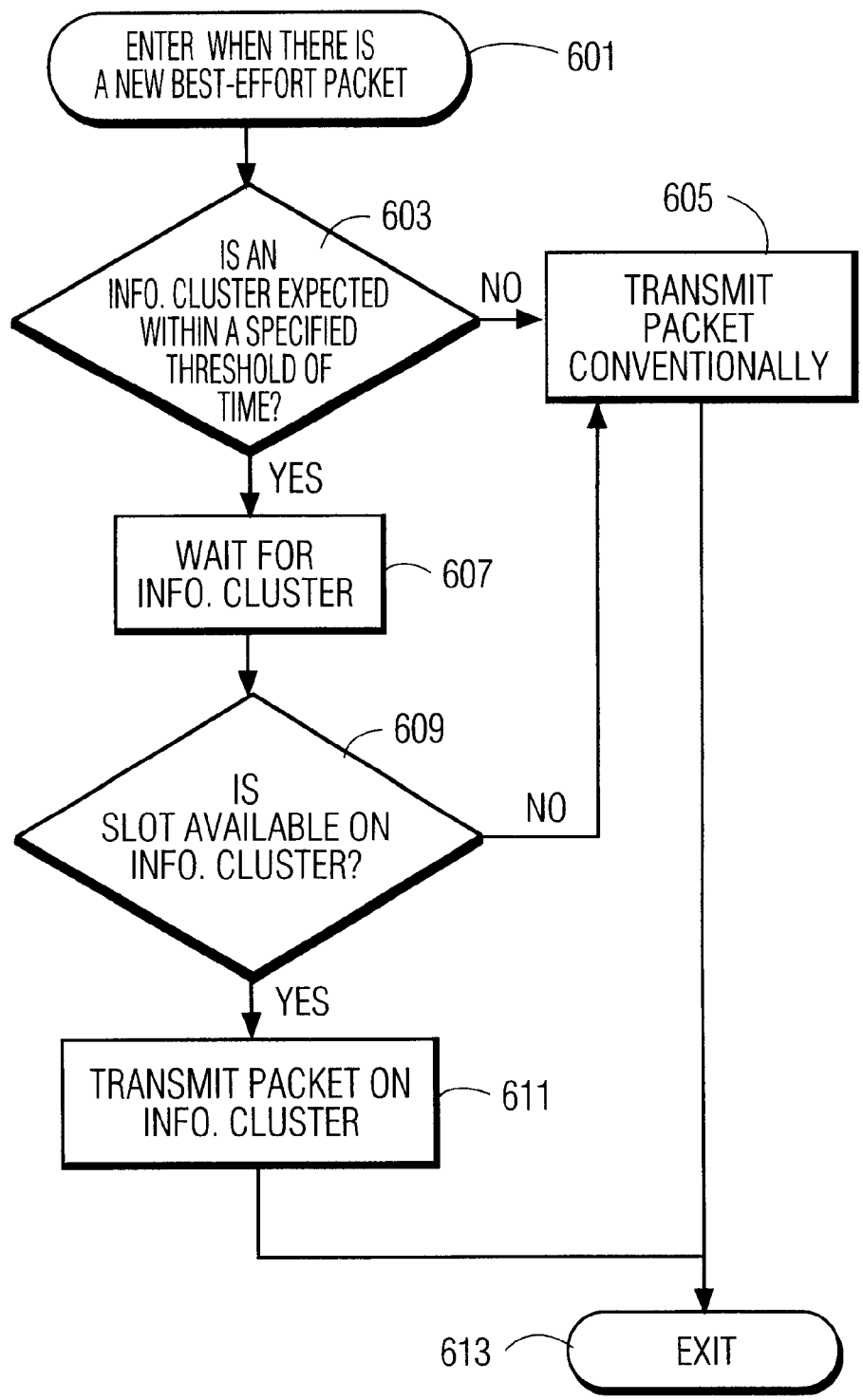
FIG. 6 is a further detailed flow chart illustrating a preferred method of transmitting information packets within the communication network of FIG. 1.

Reference is now made to FIG. 6 which more specifically illustrates a preferred method of determining how an information packet can be transmitted within the network. Specifically, as the new packet (having the status of a "best efforts" packet) enters a node for transmission to another node (step 601), it is determined whether the next arriving information cluster (at that node) will arrive within a specified period of time so as to transmit the information packet (step 603). If the next information cluster cannot satisfy the QOS requirements of the information packet, the information packet is transmitted by a conventional scheme as discussed above (step 605). If it is determined that the next arriving information cluster will arrive within the specified period, the information cluster is waited for (step 607), and it is then determined whether there is available space for the information packet (step 609). Again, if there is no available space, the "best-efforts" packet is transmitted by a conventional method (step 605). If there is space on the information cluster, the information packet is attached thereto for transmission thereby (step 611).

In this way, it can be seen that for an information packet having no quality of service constraints, the network can accommodate such packets without foregoing any priority of information packets having very particular QOS requirements.

Figure 7:
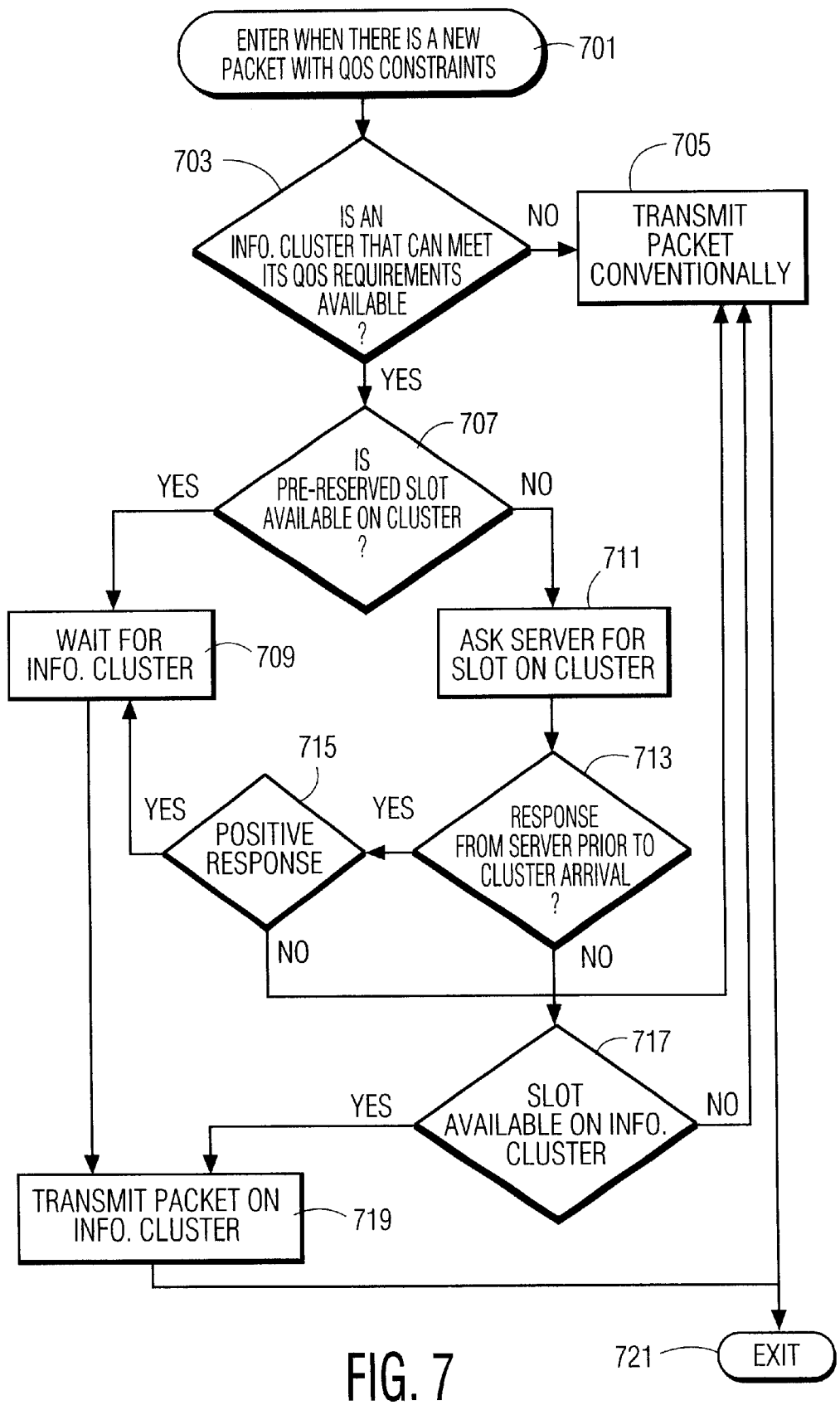
FIG. 7 is a further detailed flow chart illustrating a preferred method of transmitting information having quality of service guarantees within the communication network of FIG. 1.

Reference is now made to FIG. 7 which illustrates a preferred method of determining how an information packet having particular QOS constraints is transmitted within the network. As the new packet (having particular QOS constraints) enters a node for transmission to another node (step 701), it is also determined whether the next arriving information cluster (at that node) can meet the information packet's particular QOS constraints (step 703). If the next information cluster cannot satisfy the QOS requirements of the information packet, the information packet is transmitted by a conventional scheme as discussed above (step 705). If it is determined that the next arriving information cluster can meet the QOS constraints, it is determined whether there is pre-reserved space on the information cluster for the information packet (step 707). If there is no reserved space, server 70 is accessed (step 711) to reserve space. If server 70 responds prior to the arrival of the next information cluster (step 715) with an indication that space has been reserved on the next information cluster (step 715), the information packet will wait for the next information cluster (step 709) and will be transmitted thereon (step 719). If server 70 does not respond prior to the arrival of the next information cluster (step 715), when the information cluster does arrive at the node it is determined whether space is available thereon (step 717). If there is space on the information cluster, the information packet is attached thereto for transmission thereby (step 719). If there is no available space, the information packet is transmitted by a conventional method (step 705). Similarly, if there is a negative response from server 70 indicating that there is no space on the information cluster, the information packet is transmitted by a conventional method (step 705).

Information packets can be attached to several information clusters during its transmission among the several nodes. That is, scheduler 80 preferably periodically transmits globally the information cluster schedule to each of the controllers using conventional routing protocols such as OSPF.

The reliability of the invention depends on the quality of the algorithm for generating and maintaining the travel schedule for the information clusters throughout the network and in particular, through and among the selected nodes within the network.

Scheduler 80 determines the types of information clusters to transmit throughout the network and how frequently to run them. The scheduler coordinates the schedule of information clusters in accordance with the following constraints:
1) There should be an information cluster touching each source-destination pair of nodes at fairly frequent intervals;
2) At any given time, the total number of information clusters present at a node should not exceed its buffer capacity;
3) At any given time, a node should be able to meet the QOS (e.g. processing delay) constrains of all the information clusters at the node; and
4) Information clusters should preferably take the shortest path between the source node and the destination node.

The preferred information cluster schedule is developed with the following algorithms:
1) Run an all-pair shortest path algorithm to find shortest paths between all pairs of nodes;
2) Enumerate the N*N shortest paths between all nodes;
3) Remove the paths that are subsets of other paths to find a set of maximal paths.
4) Assign an information cluster at periodic intervals to each of the paths thus found;
5) Assign each information cluster a capacity that is proportional to the expected traffic between the stations on the node. One example is to make the capacity proportional to the length of the information cluster's path.

These constraints and algorithms can be implemented by one of ordinary skill in the art. For example, constraints and algorithms such as those outlined above can be found in Monma, C.L. and Sheng, D.D. "Backbone Network Design and Performance Analysis: A Methodology For Packet Switching Networks", *IEEE J Select Areas Commun.* SAC-4:946–965.

The entire schedule is preferably repeated periodically at a network-wide constant time-interval T which is determined by the rate of changes in the load on the network.

The schedule generated in the manner above may still violate some of the resources at some nodes, in the same sense that some nodes may not be able to buffer the information in the clusters that may be present simultaneously. This problem may be resolved by staggering the start times of the information clusters and varying the amount of time an information cluster has to stop at each node. This can be formulated as a linear optimization problem in which the variables are the starting time and the delay of an information cluster at each node, and the constraint is that at any time the buffer-space in a node should not be exceeded. There are well-known linear-programming techniques that can be used to solve this problem.

By providing a communication network in accordance with the present invention, an improved network, such as a corporate intranet or a corporate virtual private network, which provides guaranteed quality of service is provided. Such a communication architecture can also be incorporated into known network elements such as routers, switches and access nodes. Additionally, a communication network in accordance with the present invention can be utilized for internet access and advantageously used in applications directed to audio and video. Moreover, a communication network constructed in accordance with the present invention can enhance internet and intranet performance for web-based applications. Still further, a communication network constructed in accordance with the present invention can be used as a component of protocols such as PNNI, which itself is used to control networks consisting of ATM switches. And still further, networks for remote teaching, distributed classrooms and support of groupware can be significantly improved by utilizing and incorporating therein a communication network constructed in accordance with the present invention.

The above described structures and methodology are merely illustrative of the principles of the present invention. Numerous modifications and adaptations thereof will be readily apparent to those skilled in the art without departing from the spirit and scope of the present invention and the appended claims.

What is claimed is:

1. A communications network for transmitting at least one information packet between nodes of said network, said network comprising:
   a plurality of network nodes comprising a source node, a destination node, and at least a third node;
   a first information cluster and a second information cluster,
      each information cluster being configured to carry a plurality of information packets,
      the first information cluster having a predetermined first transmission path upon which the first information cluster travels among the nodes of the network and
      the second information cluster having a predetermined second transmission path, upon which the second information cluster travels among the nodes of the network, that differs from the first transmission path;
   said information packet having a destination address corresponding to the destination node; and
   a means for attaching the information packet to a select one transmission cluster of the first information cluster and the second transmission cluster, in dependence upon the destination address and at least one of the first transmission path and the second transmission path.

2. The network as claimed in claim 1, wherein said destination node includes a destination node controller for detaching said information packet from said select information cluster when said select information cluster arrives at said destination node.

3. The network as claimed in claim 2, wherein said destination node controller regulates the information packets being attached to said select,information cluster at said source node when said select information cluster is at said source node.

4. The network as claimed in claim 1, wherein said information packet has associated therewith an indication that said information packet is to be transmitted to said third node and said destination node includes a destination node controller for detaching said information packet from said select information cluster when said select information cluster arrives at said destination node based on quality of service requirements associated with said information packet.

5. The network as claimed in claim 4, wherein said second information cluster is to be transmitted between said destination node and said third node, and wherein said destination node controller attaches said information packet to said second information cluster when said information cluster arrives at said destination node based on said quality of service requirements associated with said information packet.

6. The network as claimed in claim 1, wherein said select information cluster includes at least one information slot for storing said information packet as said select information cluster is transmitted between said source node and said destination node.

7. The-network as claimed in claim 6, wherein the information packet includes a priority indicator indicating the level of priority associated with said information packet.

8. The network as claimed in claim 7, wherein said priority indicator additionally provides indication whether said information packet is attached to said select information cluster.

9. The network as claimed in claim 1, including a server for reserving space on said select information cluster for an information packet that has associated therewith quality of service requirements.

10. The network as claimed in claim 9, wherein said server determines whether at least one of the first information cluster and the second information cluster can meet said quality of service requirements of said information packet.

11. The network as claimed in claim 10, wherein:
   the means for attaching the information packet includes a source node controller for attaching said information packet to said information cluster when said information cluster arrives at said source node; and
   the source node controller communicates with said server to reserve space on the select information cluster before said select information cluster arrives at said source node.

12. The network as claimed in claim 1, including a scheduler for determining a schedule of said first and second information clusters;
   wherein said schedule includes times at which said first and second information clusters will arrive at each node of the network associated with the first and second transmission paths.

13. The network as claimed in claim 1, including
a first information packet having a first quality of service requirement and
a second information packet having a second quality of service requirement,
said first quality of service requirement being higher in priority than said second quality of service requirement;
said select information cluster having space to attach only one of said first and second information packets; and
means for selecting which of said first and said second information packets to attach to said select information cluster, said selection being based on said quality of service requirements.

14. The network as claimed in claim 12, wherein:
said destination node includes a buffer having a buffer capacity for accommodating a plurality of information packets;
said scheduler monitoring said schedule of said select information cluster arriving at said destination node to ensure that the number of information packets in said buffer at any one time is not greater than said buffer capacity.

15. The network as claimed in claim 1, including a plurality of information packets; said select information cluster having attached thereto said plurality of information packets.

16. The network as claimed in claim 1, wherein said select information cluster comprises:
an identifier identifying said select information cluster;
a capacity indicator for indicating the number of information packets simultaneously attachable to said select information cluster;
a length indicator for indicating the length of said select information cluster; and
at least one record indicator for indicating the identification of the source node of an information packet, the destination node of said information packet, and the quality of service requirements of said information packet.

17. A method of transmitting an information packet among nodes in a communications network, said method comprising:
identifying a plurality of information clusters,
each information cluster of the plurality of information clusters being configured to carry a plurality of information packets,
each information cluster having a predetermined transmission path associated therewith, upon which each information cluster travels among the nodes in the communications network,
wherein the respective transmission paths associated with at least two of the information clusters differ;
transmitting an information cluster of the plurality of information clusters to a source node;
attaching said information packet to said information cluster in dependence upon the predetermined transmission path associated with said information cluster when said information cluster arrives at said source node;
transmitting said information cluster to said destination node in dependence upon the transmission path associated with said information cluster; and
detaching said information packet from said information cluster when said information cluster arrives at said destination node.

18. The method as claimed in claim 17, wherein said information cluster arrives at said source node at a first scheduled arrival time and further wherein said information cluster arrives at said destination node at a second scheduled arrival time.

19. The method as claimed in claim 18, and including the step of updating said first and second scheduled times based on dynamically changing requirements of said network.

20. The network as claimed in claim 17, including placing said information packet on a data bus connected to said destination node after said information packet has been detached from said information cluster at said destination node.

21. The network as claimed in claim 17, including placing said information packet in a buffer in said destination node after said information packet has been detached from said information cluster at said destination node.

22. The network as claimed in claim 21, and including the step of attaching the information packet being stored in said buffer to a subsequently arriving information cluster when said subsequently arriving information cluster arrives at said destination node.

23. A communications network for transmitting at least one information packet between nodes of said network, said network comprising:
a plurality of network nodes comprising a source node, a destination node, and at least a third node;
a first information cluster and a second information cluster,
each information cluster being configured to carry a plurality of information packets,
the first information cluster having a predetermined first transmission path upon which the first information cluster travels among the nodes of the network and
the second information cluster having a predetermined second transmission path, upon which the second information cluster travels among the nodes of the network, that differs from the first transmission path;
each said information packet having a destination address corresponding to the destination node; and
a means for attaching the information packet to a select one transmission cluster of the first information cluster and the second information cluster, in dependence upon the destination address and at least one of the first transmission path and the second transmission path; and
a server for reserving space on said transmission cluster for said information packet, based on a quality of service requirement associated with said information packet.

24. A method of transmitting an information packet among nodes in a communications network, said method comprising:
identifying a plurality of information clusters,
each information cluster of the plurality of information clusters being configured to carry a plurality of information packets,
each information cluster having a predetermined transmission path associated therewith, upon which the information cluster travels among the nodes in the communications network,
wherein the respective transmission paths associated with at least two of the information clusters differ;
transmitting an information cluster of the plurality of information clusters to a source node;
attaching said information packet to said information cluster in dependence upon the predetermined transmission path associated with said information cluster when said information cluster arrives at said source node;

transmitting said information cluster to said destination node in dependence upon the transmission path associated with said information cluster; and detaching said information packet from said information cluster when said information cluster arrives at said destination node;

wherein said information cluster arrive at said source node at a first scheduled arrival time and said information cluster arrives at said destination node at a second scheduled arrival time.

* * * * *